(12) United States Patent
Eisen et al.

(10) Patent No.: US 10,983,800 B2
(45) Date of Patent: *Apr. 20, 2021

(54) RECONFIGURABLE PROCESSOR WITH LOAD-STORE SLICES SUPPORTING REORDER AND CONTROLLING ACCESS TO CACHE SLICES

(71) Applicant: INTERNATIONAL BUSINESS MACHINES CORPORATION, Armonk, NY (US)

(72) Inventors: Lee Evan Eisen, Round Rock, TX (US); Hung Qui Le, Austin, TX (US); Jentje Leenstra, Bondorf (DE); Jose Eduardo Moreira, Irvington, NY (US); Bruce Joseph Ronchetti, Austin, TX (US); Brian William Thompto, Austin, TX (US); Albert James Van Norstrand, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 123 days.

This patent is subject to a terminal disclaimer.

(21) Appl. No.: 16/001,333

(22) Filed: Jun. 6, 2018

(65) Prior Publication Data

US 2018/0285118 A1    Oct. 4, 2018

Related U.S. Application Data

(63) Continuation of application No. 15/883,601, filed on Jan. 30, 2018, now Pat. No. 10,083,039, which is a
(Continued)

(51) Int. Cl.
*G06F 9/38* (2018.01)
*G06F 9/30* (2018.01)
(Continued)

(52) U.S. Cl.
CPC ........ *G06F 9/3851* (2013.01); *G06F 9/30145* (2013.01); *G06F 9/30189* (2013.01);
(Continued)

(58) Field of Classification Search
CPC ............... G06F 9/3851; G06F 12/0848; G06F 12/0875; G06F 9/3836; G06F 9/3887
See application file for complete search history.

(56) References Cited

U.S. PATENT DOCUMENTS

| 4,858,113 A | 8/1989 | Saccardi |
| 5,055,999 A | 10/1991 | Frank et al. |

(Continued)

FOREIGN PATENT DOCUMENTS

| CN | 101021778 A | 8/2007 |
| CN | 101676865 A | 3/2010 |

(Continued)

OTHER PUBLICATIONS

List of IBM Patents or Patent Applications Treated as Related, Signed Nov. 7, 2019, 2 pages.

(Continued)

*Primary Examiner* — Jyoti Mehta
(74) *Attorney, Agent, or Firm* — Grant Johnson

(57) ABSTRACT

A processor core having multiple parallel instruction execution slices and coupled to multiple dispatch queues provides flexible and efficient use of internal resources. The configuration of the execution slices is selectable so that capabilities of the processor core can be adjusted according to execution requirements for the instruction streams. A plurality of load-store slices coupled to the execution slices provides access to a plurality of cache slices that partition the lowest level of cache memory among the load-store slices.

20 Claims, 7 Drawing Sheets

Related U.S. Application Data continuation of application No. 14/594,716, filed on Jan. 12, 2015, now Pat. No. 9,977,678.

(51) Int. Cl.
*G06F 12/0875* (2016.01)
*G06F 12/0846* (2016.01)

(52) U.S. Cl.
CPC .......... *G06F 9/3836* (2013.01); *G06F 9/3887* (2013.01); *G06F 12/0848* (2013.01); *G06F 12/0875* (2013.01); *G06F 2212/1048* (2013.01); *G06F 2212/282* (2013.01); *G06F 2212/452* (2013.01); *Y02D 10/00* (2018.01)

(56) References Cited

U.S. PATENT DOCUMENTS

| | | |
|---|---|---|
| 5,095,424 A | 3/1992 | Woffinden et al. |
| 5,471,593 A | 11/1995 | Branigin |
| 5,475,856 A | 12/1995 | Kogge |
| 5,553,305 A | 9/1996 | Gregor et al. |
| 5,630,149 A | 5/1997 | Bluhm |
| 5,680,597 A | 10/1997 | Kumar et al. |
| 5,822,602 A | 10/1998 | Thusoo |
| 5,996,068 A | 11/1999 | Dwyer, III et al. |
| 6,026,478 A | 2/2000 | Dowling |
| 6,044,448 A | 3/2000 | Agrawal et al. |
| 6,073,215 A | 6/2000 | Snyder |
| 6,073,231 A | 6/2000 | Bluhm et al. |
| 6,092,175 A | 7/2000 | Levy et al. |
| 6,112,019 A | 8/2000 | Chamdani et al. |
| 6,119,203 A | 9/2000 | Snyder et al. |
| 6,138,230 A | 10/2000 | Hervin et al. |
| 6,145,054 A | 11/2000 | Mehrotra et al. |
| 6,170,051 B1 | 1/2001 | Dowling |
| 6,212,544 B1 | 4/2001 | Borkenhagen et al. |
| 6,237,081 B1 | 5/2001 | Le et al. |
| 6,286,027 B1 | 9/2001 | Dwyer, III et al. |
| 6,311,261 B1 | 10/2001 | Chamdani et al. |
| 6,336,183 B1 | 1/2002 | Le et al. |
| 6,356,918 B1 | 3/2002 | Chuang et al. |
| 6,381,676 B2 | 4/2002 | Aglietti et al. |
| 6,425,073 B2 | 7/2002 | Roussel et al. |
| 6,463,524 B1 | 10/2002 | Delaney et al. |
| 6,487,578 B2 | 11/2002 | Ranganathan |
| 6,549,930 B1 | 4/2003 | Chrysos et al. |
| 6,564,315 B1 | 5/2003 | Keller et al. |
| 6,728,866 B1 | 4/2004 | Kahle et al. |
| 6,732,236 B2 | 5/2004 | Favor |
| 6,839,828 B2 | 1/2005 | Gschwind et al. |
| 6,868,491 B1 | 3/2005 | Moore |
| 6,883,107 B2 | 4/2005 | Rodgers et al. |
| 6,944,744 B2 | 9/2005 | Ahmed et al. |
| 6,948,051 B2 | 9/2005 | Rivers et al. |
| 6,954,846 B2 | 10/2005 | Leibholz et al. |
| 6,978,459 B1 | 12/2005 | Dennis et al. |
| 7,020,763 B2 | 3/2006 | Saulsbury et al. |
| 7,024,543 B2 | 4/2006 | Grisenthwaite et al. |
| 7,086,053 B2 | 8/2006 | Long et al. |
| 7,093,105 B2 | 8/2006 | Webb, Jr. et al. |
| 7,100,028 B2 | 8/2006 | McGrath et al. |
| 7,114,163 B2 | 9/2006 | Hardin et al. |
| 7,124,160 B2 | 10/2006 | Saulsbury et al. |
| 7,155,600 B2 | 12/2006 | Burky et al. |
| 7,191,320 B2 | 3/2007 | Hooker et al. |
| 7,263,624 B2 | 8/2007 | Marchand et al. |
| 7,290,261 B2 | 10/2007 | Burky et al. |
| 7,302,527 B2 | 11/2007 | Barrick et al. |
| 7,386,704 B2 | 6/2008 | Schulz et al. |
| 7,395,419 B1 | 7/2008 | Gonion |
| 7,398,374 B2 | 7/2008 | DeLano |
| 7,469,318 B2 | 12/2008 | Chung et al. |
| 7,478,198 B2 | 1/2009 | Latorre et al. |
| 7,478,225 B1 | 1/2009 | Brooks et al. |
| 7,490,220 B2 | 2/2009 | Balasubramonian et al. |
| 7,512,724 B1 | 3/2009 | Dennis et al. |
| 7,565,652 B2 | 7/2009 | Janssen et al. |
| 7,600,096 B2 | 10/2009 | Parthasarathy et al. |
| 7,656,013 B2 | 2/2010 | Horiuchi et al. |
| 7,669,035 B2 | 2/2010 | Young et al. |
| 7,669,036 B2 | 2/2010 | Brown et al. |
| 7,694,112 B2 | 4/2010 | Barowski et al. |
| 7,707,390 B2 | 4/2010 | Ozer et al. |
| 7,721,069 B2 | 5/2010 | Ramchandran et al. |
| 7,793,278 B2 | 9/2010 | Du et al. |
| 7,836,317 B2 | 11/2010 | Marchand et al. |
| 7,865,769 B2 | 1/2011 | Luick |
| 7,889,204 B2 | 2/2011 | Hansen et al. |
| 7,890,735 B2 | 2/2011 | Tran |
| 7,926,023 B2 | 4/2011 | Okawa et al. |
| 7,975,134 B2 | 7/2011 | Gonion |
| 7,979,677 B2 | 7/2011 | Nguyen |
| 7,987,344 B2 | 7/2011 | Hansen et al. |
| 8,028,152 B2 | 9/2011 | Glew |
| 8,041,928 B2 | 10/2011 | Burky et al. |
| 8,046,566 B2 | 10/2011 | Abernathy et al. |
| 8,074,224 B1 | 12/2011 | Nordquist et al. |
| 8,099,556 B2 | 1/2012 | Ghosh et al. |
| 8,103,852 B2 | 1/2012 | Bishop et al. |
| 8,108,656 B2 | 1/2012 | Katragadda et al. |
| 8,135,942 B2 | 3/2012 | Abernathy et al. |
| 8,140,832 B2 | 3/2012 | Mejdrich et al. |
| 8,141,088 B2 | 3/2012 | Morishita et al. |
| 8,166,282 B2 | 4/2012 | Madriles et al. |
| 8,219,783 B2 | 7/2012 | Hara |
| 8,250,341 B2 | 8/2012 | Schulz et al. |
| 8,335,892 B1 | 12/2012 | Minkin et al. |
| 8,386,751 B2 | 2/2013 | Ramchandran et al. |
| 8,412,914 B2 | 4/2013 | Gonion |
| 8,464,025 B2 | 6/2013 | Yamaguchi et al. |
| 8,489,791 B2 | 7/2013 | Byrne et al. |
| 8,555,039 B2 | 10/2013 | Rychlik |
| 8,578,140 B2 | 11/2013 | Yokoi |
| 8,656,401 B2 | 2/2014 | Venkataramanan et al. |
| 8,683,182 B2 | 3/2014 | Hansen et al. |
| 8,700,877 B2 | 4/2014 | Shebanow et al. |
| 8,713,263 B2 | 4/2014 | Bryant |
| 8,732,438 B2 | 5/2014 | Caprioli et al. |
| 8,850,121 B1 | 9/2014 | Ashcraft et al. |
| 8,949,572 B2 | 2/2015 | Kurosawa et al. |
| 8,966,232 B2 | 2/2015 | Tran |
| 8,984,264 B2 | 3/2015 | Karlsson et al. |
| 9,207,995 B2 | 12/2015 | Boersma et al. |
| 9,223,709 B1 | 12/2015 | O'Bleness et al. |
| 9,250,899 B2 | 2/2016 | Gschwind |
| 9,262,174 B2 | 2/2016 | Fetterman et al. |
| 9,323,739 B2 | 4/2016 | Nicholson et al. |
| 9,417,879 B2 | 8/2016 | Wilkerson et al. |
| 9,424,045 B2 | 8/2016 | Airaud et al. |
| 9,519,484 B1 | 12/2016 | Stark |
| 9,639,369 B2 | 5/2017 | Blasco |
| 9,665,372 B2 | 5/2017 | Eisen et al. |
| 9,672,043 B2 | 6/2017 | Eisen et al. |
| 9,690,585 B2 | 6/2017 | Eisen et al. |
| 9,690,586 B2 | 6/2017 | Eisen et al. |
| 9,720,696 B2 | 8/2017 | Chu et al. |
| 9,740,486 B2 | 8/2017 | Boersma et al. |
| 9,760,375 B2 | 9/2017 | Boersma et al. |
| 9,817,667 B2 | 11/2017 | Spadini |
| 9,842,005 B2 | 12/2017 | Abdallah |
| 9,870,229 B2 | 1/2018 | Chu et al. |
| 2002/0194251 A1 | 12/2002 | Richter et al. |
| 2003/0120882 A1 | 6/2003 | Granston et al. |
| 2004/0111594 A1 | 6/2004 | Feiste et al. |
| 2004/0162966 A1 | 8/2004 | Webb, Jr. et al. |
| 2004/0216101 A1 | 10/2004 | Burky et al. |
| 2005/0138290 A1 | 6/2005 | Hammarlund et al. |
| 2006/0095710 A1 | 5/2006 | Pires Dos Reis Moreira et al. |
| 2007/0022277 A1 | 1/2007 | Iwamura et al. |
| 2007/0204137 A1* | 8/2007 | Tran .............. G06F 9/3861 712/214 |
| 2007/0226470 A1 | 9/2007 | Krimer et al. |
| 2009/0113182 A1 | 4/2009 | Abernathy et al. |
| 2009/0172370 A1 | 7/2009 | Butler |

(56) References Cited

U.S. PATENT DOCUMENTS

| | | | |
|---|---|---|---|
| 2009/0265514 | A1 | 10/2009 | Biles et al. |
| 2010/0161945 | A1* | 6/2010 | Burky .................. G06F 9/3834 |
| | | | 712/215 |
| 2011/0161616 | A1 | 6/2011 | Tarjan et al. |
| 2012/0246450 | A1* | 9/2012 | Abdallah ............ G06F 9/30123 |
| | | | 712/216 |
| 2012/0278590 | A1 | 11/2012 | Lin et al. |
| 2013/0028332 | A1 | 1/2013 | Le Leannec et al. |
| 2013/0054939 | A1 | 2/2013 | Felch |
| 2014/0351562 | A1 | 11/2014 | Spadini |
| 2014/0380019 | A1 | 12/2014 | Wilkerson et al. |
| 2016/0103715 | A1 | 4/2016 | Sethia et al. |
| 2016/0202986 | A1 | 7/2016 | Ayub et al. |
| 2016/0202988 | A1 | 7/2016 | Ayub et al. |
| 2016/0202989 | A1 | 7/2016 | Eisen et al. |
| 2016/0202990 | A1 | 7/2016 | Brownscheidle et al. |
| 2016/0202991 | A1 | 7/2016 | Eisen et al. |
| 2016/0202992 | A1 | 7/2016 | Brownscheidle et al. |
| 2017/0168837 | A1 | 6/2017 | Eisen et al. |
| 2020/0073668 | A1 | 3/2020 | Chu |

FOREIGN PATENT DOCUMENTS

| | | |
|---|---|---|
| CN | 101876892 A | 11/2010 |
| CN | 102004719 A | 4/2011 |
| CN | 102122275 A | 7/2011 |
| GB | 2493209 A | 1/2013 |
| JP | H11252179 A | 9/1999 |
| JP | 2006114036 A | 4/2006 |
| JP | 2007172610 A | 7/2007 |
| JP | 2009009570 A | 1/2009 |
| JP | 2013521557 A5 | 8/2015 |
| WO | 2011082690 A1 | 7/2011 |

OTHER PUBLICATIONS

U.S. Appl. No. 15/883,601, filed Jan. 30, 2018, Eisen, et al.
U.S. Appl. No. 15/805,267, filed Nov. 7, 2017, Chu, et al.
List of IBM Patents or Patent Applications Treated as Related, 3 pages.
Office Action in U.S. Appl. No. 14/594,716 dated Jun. 14, 2017, 57 pages (pp. 1-57 in pdf).
Notice of Allowance in U.S. Appl. No. 14/594,716 dated Jan. 17, 2018, 58 pages (pp. 1-58 in pdf).
Office Action in U.S. Appl. No. 14/723,940 dated Jun. 14, 2017, 45 pages (pp. 1-45 in pdf).
Notice of Allowance in U.S. Appl. No. 14/723,940 dated Jan. 12, 2018, 41 pages (pp. 1-41 in pdf).
Gebhart et al., "A Hierarchical Thread Scheduler and Register File for Energy-Efficient Throughput Processors", ACM Transactions on Computer Systems, Apr. 2012, pp. 8:1-8:38, (38 pages in pdf),vol. 30, No. 2, Article 8, ACM.
"Method and system for Implementing "Register Threads" in a Simultaneously-Multithreaded (SMT) Processor Core", An IP.com Prior Art Database Technical Disclosure, Authors et. al.: Disclosed Anonymously, IP.com No. IPCOM000199825D, IP.com Electronic Publication: Sep. 17, 2010, pp. 1-4, <http://ip.com/IPCOM/000199825>.
Pechanek, et al., "ManArray Processor Interconnection Network: An Introduction", Euro-Par' 99 Parallel Processing, Lecture Notes in Computer Science, 5th International Euro-Par Conference, Aug. 31-Sep. 3, 1999 Proceedings, pp. 761-765, vol. 1685, Spring Berlin Heidelberg, Toulouse, France.
Pechanek, et al., "The ManArray Embedded Processor Architecture",Proceedings of the 26th Euromicro Conference, IEEE Computer Society, Sep. 5-7, 2000, pp. 348-355, vol. 1, Maastricht.
Czajkowski, et al., "Resource Management for Extensible Internet Servers", Proceedings of the 8th ACM SIGOPS European Workshop on Support for Composing Distributed Applications, Sep. 1998, pp. 33-39, ACM, Portugal.
Bridges, et al., "A CPU Utilization Limit for Massively Parallel MIMD Computers", Fourth Symposium on the Frontiers of Massively Parallel Computing, Oct. 19-21, 1992, pp. 83-92, IEEE, VA, US.
Notice of Allowance in U.S. Appl. No. 15/883,601 dated May 15, 2018, 45 pages (pp. 1-45 in pdf).
JP Office Action and Partial Translation of Office Action for JP Application 2017-530696, dated May 13, 2019, 10 pages.
International Search Report and Written Opinion, dated May 4, 2016, International Application No. PCT/IB2016/050089, 11 pages.

* cited by examiner

RECONFIGURABLE PROCESSOR WITH LOAD-STORE SLICES SUPPORTING REORDER AND CONTROLLING ACCESS TO CACHE SLICES

The present Application is a Continuation of U.S. patent application Ser. No. 15/883,601, filed on Jan. 30, 2018, which is a Continuation of U.S. patent application Ser. No. 14/594,716, filed on Jan. 12, 2015 and issued as U.S. Pat. No. 9,977,678 on May 22, 2018. The present Application claims priority to each of the above-referenced U.S. Patent Applications under 35 U.S.C. § 120. The disclosures of all of the above-referenced parent U.S. Patent Applications are incorporated herein by reference.

BACKGROUND OF THE INVENTION

1. Field of the Invention

The present invention is related to processing systems and processors, and more specifically to a pipelined processor core with reconfigurable architecture.

2. Description of Related Art

In present-day processor cores, pipelines are used to execute multiple hardware threads corresponding to multiple instruction streams, so that more efficient use of processor resources can be provided through resource sharing and by allowing execution to proceed even while one or more hardware threads are waiting on an event.

In existing systems, specific resources and pipelines are typically provided in a given processor design, the execution resource types are fixed and in many instances, particular types of execution resources may be absent from certain processor cores, while other processor core types may have different execution resources. In some instances, resources within a processor core will remain unused except when needed on rare occasions, consuming die area that might otherwise be used to increase processor core performance.

It would therefore be desirable to provide a processor core and a method for processing program instructions that provide improved use of the processor core resources.

BRIEF SUMMARY OF THE INVENTION

The invention is embodied in a processor core, computer system, and method. The method is a method of operation of the processor core, and the computer system is a system that includes the processor core.

The processor core includes multiple parallel instruction execution slices for executing multiple instruction streams in parallel and multiple dispatch queues from which the instructions are dispatched to issue queues of the plurality of parallel instruction execution slices. The processor core also includes a plurality of cache slices containing mutually-exclusive segments of a lowest-order level of cache memory and a plurality of load-store slices coupling the plurality of cache slices to the plurality of parallel instruction execution slices for executing load and store portions of execution corresponding to the instructions of the corresponding plurality of instruction streams and controlling access by the plurality of parallel instruction execution slices to the plurality of cache slices. The individual load-store slices include a load-store access queue that receives load and store operations corresponding to the load and store portions of the instructions of the corresponding plurality of instruction streams, a load reorder queue containing first entries for tracking load operations issued to a corresponding cache slice and a store reorder queue containing second entries for tracking store operations issued to the corresponding cache slice.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to processors and processing systems in which conventional pipelines are replaced with execution slices that can be reconfigured to efficiently allocate subsets of resources based on one or more thread mode control signals that may select between single-threaded mode, multi-threaded mode and different numbers of simultaneously executing hardware threads. The mode control signal may also select between configurations that combine two or more execution slices to form larger super-slices for handling wider operand operations, wider operators or vector operations.

Figure 1:
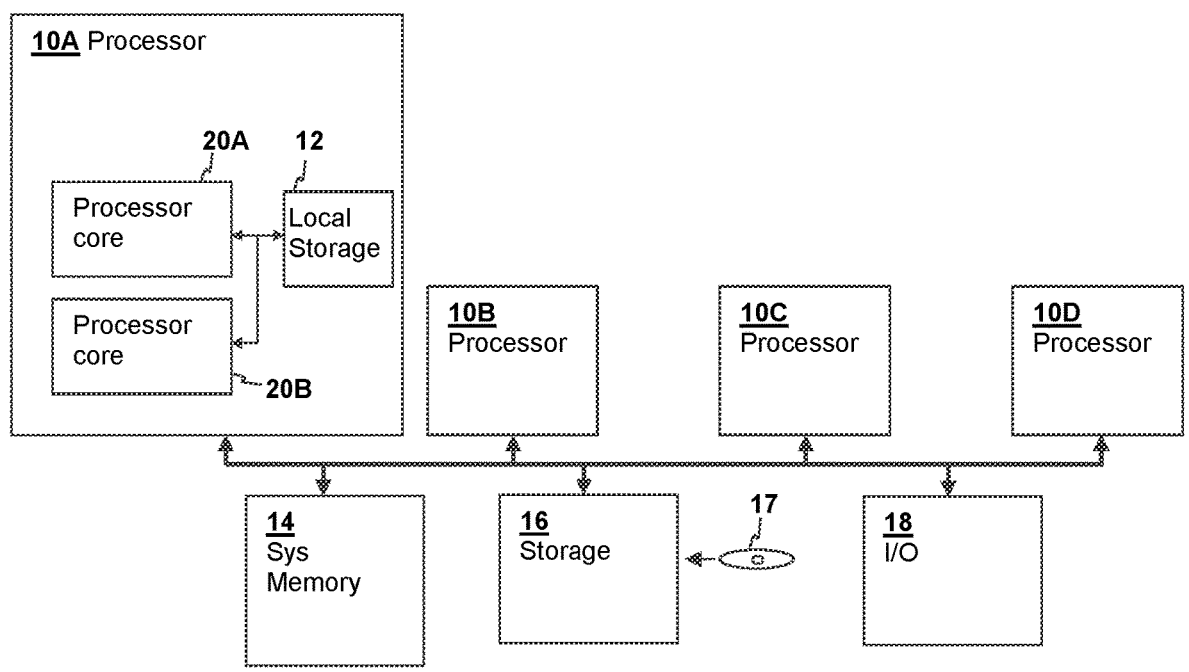
FIG. 1 is a block diagram illustrating a processing system in which techniques according to an embodiment of the present invention are practiced.

Referring now to FIG. 1, a processing system in accordance with an embodiment of the present invention is shown. The depicted processing system includes a number of processors 10A-10D, each in conformity with an embodiment of the present invention. The depicted multi-processing system is illustrative, and a processing system in accordance with other embodiments of the present invention include uni-processor systems having multi-threaded cores. Processors 10A-10D are identical in structure and include cores 20A-20B and a local storage 12, which may be a cache level, or a level of internal system memory. Processors 10A-10B are coupled to a main system memory 14, a storage subsystem 16, which includes non-removable drives and optical drives, for reading media such as a CD-ROM 17 forming a computer program product and containing program instructions implementing generally, at least one operating system, associated applications programs, and optionally a hypervisor for controlling multiple operating systems' partitions for execution by processors 10A-10D. The illustrated processing system also includes input/output (I/O) interfaces and devices 18 such as mice and keyboards for receiving user input and graphical displays for displaying information. While the system of FIG. 1 is used to provide an illustration of a system in which the processor architecture of the present invention is implemented, it is understood that the depicted architecture is not limiting and is intended to provide an example of a suitable computer system in which the techniques of the present invention are applied.

Figure 2:
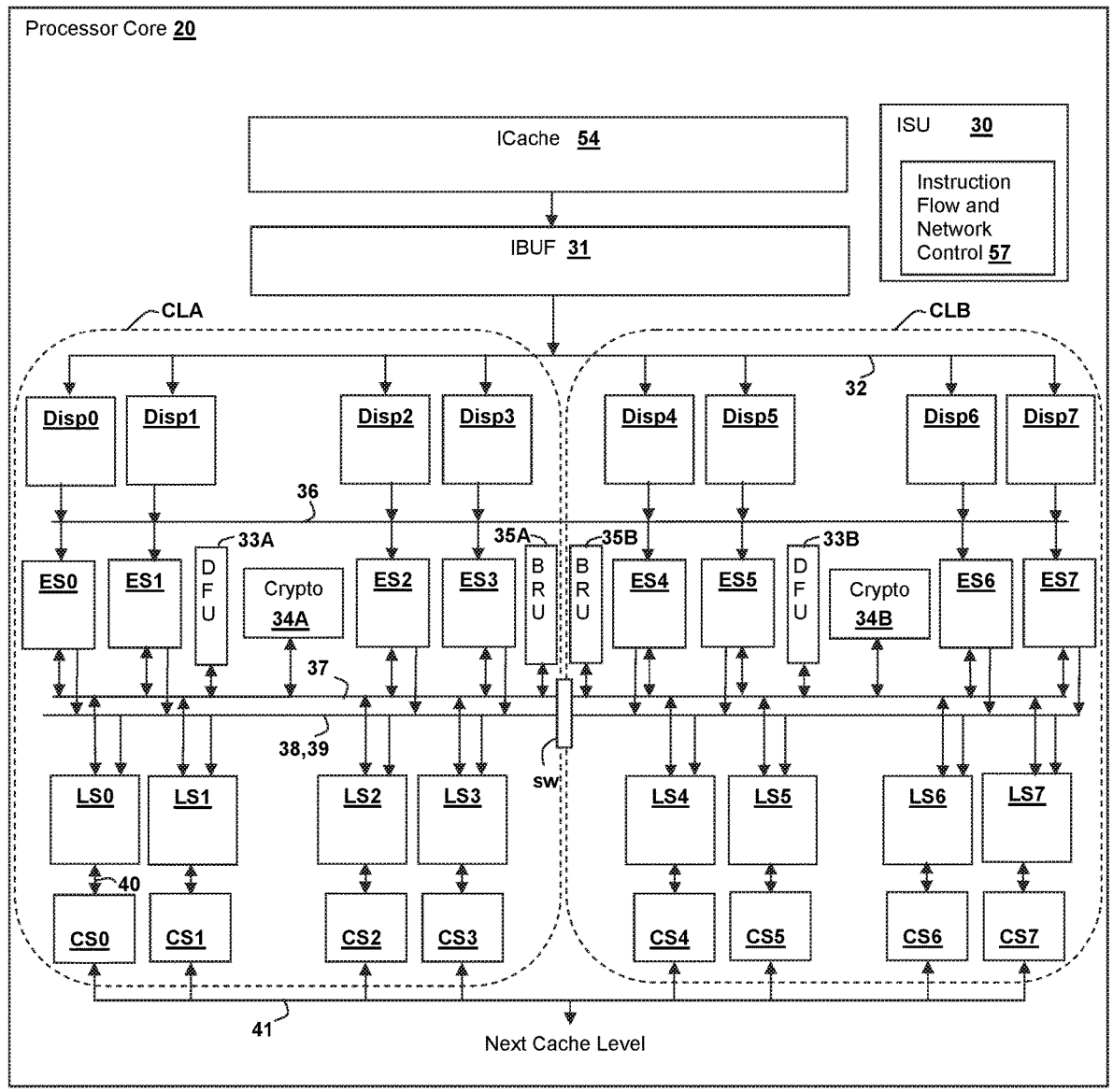
FIG. 2 is a block diagram illustrating details of a processor core 20 that can be used to implement processor cores 20A-20B of FIG. 1.

Referring now to FIG. 2, details of an exemplary processor core 20 that can be used to implement processor cores 20A-20B of FIG. 1 are illustrated. Processor core 20 includes an instruction cache (ICache) 54 and instruction buffer (IBUF) 31 that store multiple instruction streams fetched from cache or system memory and present the instruction stream(s) via a bus 32 to a plurality of dispatch queues Disp0-Disp7 within each of two clusters CLA and CLB. Control logic within processor core 20 controls the dispatch of instructions from dispatch queues Disp0-Disp7 to a plurality of instruction execution slices ES0-ES7 via a dispatch routing network 36 that permits instructions from any of dispatch queues Disp0-Disp7 to any of instruction execution slices ES0-ES7 in either of clusters CLA and CLB, although complete cross-point routing, i.e., routing from any dispatch queue to any slice is not a requirement of the invention. In certain configurations as described below, the dispatch of instructions from dispatch queues Disp0-Disp3 in cluster CLA will be restricted to execution slices ES0-ES3 in cluster CLA, and similarly the dispatch of instructions from dispatch queues Disp4-Disp7 in cluster CLB will be restricted to execution slices ES4-ES7. Instruction execution slices ES0-ES7 perform sequencing and execution of logical, mathematical and other operations as needed to perform the execution cycle portion of instruction cycles for instructions in the instruction streams, and may be identical general-purpose instruction execution slices ES0-ES7, or processor core 20 may include special-purpose execution slices ES0-ES7. Other special-purpose units such as cryptographic processors 34A-34B, decimal floating points units (DFU) 33A-33B and separate branch execution units (BRU) 35A-35B may also be included to free general-purpose execution slices ES0-ES7 for performing other tasks. Instruction execution slices ES0-ES7 may include multiple internal pipelines for executing multiple instructions and/or portions of instructions.

The load-store portion of the instruction execution cycle, (i.e., the operations performed to maintain cache consistency as opposed to internal register reads/writes), is performed by a plurality of load-store (LS) slices LS0-LS7, which manage load and store operations as between instruction execution slices ES0-ES7 and a cache memory formed by a plurality of cache slices CS0-CS7 which are partitions of a lowest-order cache memory. Cache slices CS0-CS3 are assigned to partition CLA and cache slices CS4-CS7 are assigned to partition CLB in the depicted embodiment and each of load-store slices LS0-LS7 manages access to a corresponding one of the cache slices CS0-CS7 via a corresponding one of dedicated memory buses 40. In other embodiments, there may be not be a fixed partitioning of the cache, and individual cache slices CS0-CS7 or sub-groups of the entire set of cache slices may be coupled to more than one of load-store slices LS0-LS7 by implementing memory buses 40 as a shared memory bus or buses. Load-store slices LS0-LS7 are coupled to instruction execution slices ES0-ES7 by a write-back (result) routing network 37 for returning result data from corresponding cache slices CS0-CS7, such as in response to load operations. Write-back routing network 37 also provides communications of write-back results between instruction execution slices ES0-ES7. An address generating (AGEN) bus 38 and a store data bus 39 provide communications for load and store operations to be communicated to load-store slices LS0-LS7. For example, AGEN bus 38 and store data bus 39 convey store operations that are eventually written to one of cache slices CS0-CS7 via one of memory buses 40 or to a location in a higher-ordered level of the memory hierarchy to which cache slices CS0-CS7 are coupled via an I/O bus 41, unless the store operation is flushed or invalidated. AGEN bus 38 and store data bus 39 are shown as a single bus line in the Figures for clarity. Load operations that miss one of cache slices CS0-CS7 after being issued to the particular cache slice CS0-CS7 by one of load-store slices LS0-LS7 are satisfied over I/O bus 41 by loading the requested value into the particular cache slice CS0-CS7 or directly through cache slice CS0-CS7 and memory bus 40 to the load-store slice LS0-LS7 that issued the request. In the depicted embodiment, any of load-store slices LS0-LS7 can be used to perform a load-store operation portion of an instruction for any of instruction execution slices ES0-ES7, but that is not a requirement of the invention. Further, in some embodiments, the determination of which of cache slices CS0-CS7 will perform a given load-store operation may be made based upon the operand address of the load-store operation together with the operand width and the assignment of the addressable byte of the cache to each of cache slices CS0-CS7.

Instruction execution slices ES0-ES7 may issue internal instructions concurrently to multiple pipelines, e.g., an instruction execution slice may simultaneously perform an execution operation and a load/store operation and/or may execute multiple arithmetic or logical operations using multiple internal pipelines. The internal pipelines may be identical, or may be of discrete types, such as floating-point, scalar, load/store, etc. Further, a given execution slice may have more than one port connection to write-back routing network 37, for example, a port connection may be dedicated to load-store connections to load-store slices LS0-LS7, or may provide the function of AGEN bus 38 and/or data bus 39, while another port may be used to communicate values to and from other slices, such as special-purposes slices, or other instruction execution slices. Write-back results are scheduled from the various internal pipelines of instruction execution slices ES0-ES7 to write-back port(s) that connect instruction execution slices ES0-ES7 to write-back routing network 37. Cache slices CS0-CS7 are coupled to a next higher-order level of cache or system memory via I/O bus 41 that may be integrated within, or external to, processor core 20. While the illustrated example shows a matching number of load-store slices LS0-LS7 and execution slices ES0-ES7, in practice, a different number of each type of slice can be provided according to resource needs for a particular implementation.

Within processor core 20, an instruction sequencer unit (ISU) 30 includes an instruction flow and network control block 57 that controls dispatch routing network 36, write-back routing network 37, AGEN bus 38 and store data bus 39. Network control block 57 also coordinates the operation of execution slices ES0-ES7 and load-store slices LS0-LS7 with the dispatch of instructions from dispatch queues Disp0-Disp7. In particular, instruction flow and network control block 57 selects between configurations of execution slices ES0-ES7 and load-store slices LS0-LS7 within processor core 20 according to one or more mode control signals that allocate the use of execution slices ES0-ES7 and load-store slices LS0-LS7 by a single thread in one or more single-threaded (ST) modes, and multiple threads in one or more multi-threaded (MT) modes, which may be simultaneous multi-threaded (SMT) modes. For example, in the configuration shown in FIG. 2, cluster CLA may be allocated to one or more hardware threads forming a first thread set in SMT mode so that dispatch queues Disp0-Disp3 only receive instructions of instruction streams for the first thread set, execution slices ES0-ES3 and load-store slices LS0-LS3 only perform operations for the first thread set and cache slices CS0-CS3 form a combined cache memory that only contains values accessed by the first thread set. Similarly, in such an operating mode, cluster CLB is allocated to a second hardware thread set and dispatch queues Disp4-Disp7 only receive instructions of instruction streams for the second thread set, execution slices ES4-ES7 and LS slices LS4-LS7 only perform operations for the second thread set and cache slices CS4-CS7 only contain values accessed by the second thread set. When communication is not required across clusters, write-back routing network 37 can be partitioned by disabling transceivers or switches sw connecting the portions of write-back routing network 37, cluster CLA and cluster CLB. Separating the portions of write-back routing network 37 provides greater throughput within each cluster and allows the portions of write-back routing network 37 to provide separate simultaneous routes for results from execution slices ES0-ES7 and LS slices LS0-LS7 for the same number of wires in write-back routing network 37. Thus, twice as many transactions can be supported on the divided write-back routing network 37 when switches sw are open. Other embodiments of the invention may sub-divide the sets of dispatch queues Disp0-Disp7, execution slices ES0-ES7, LS slices LS0-LS7 and cache slices CS0-CS7, such that a number of clusters are formed, each operating on a particular set of hardware threads. Similarly, the threads within a set may be further partitioned into subsets and assigned to particular ones of dispatch queues Disp0-Disp7, execution slices ES0-ES7, LS slices LS0-LS7 and cache slices CS0-CS7. However, the partitioning is not required to extend across all of the resources listed above. For example, clusters CLA and CLB might be assigned to two different hardware thread sets, and execution slices ES0-ES2 and LS slices LS0-LS1 assigned to a first subset of the first hardware thread set, while execution slice ES3 and LS slices LS2-LS3 are assigned to a second subject of the first hardware thread set, while cache slices CS0-CS3 are shared by all threads within the first hardware thread set. In a particular embodiment according to the above example, switches may be included to further partition write back routing network 37 between execution slices ES0-ES7 such that connections between sub-groups of execution slices ES0-ES7 that are assigned to different thread sets are isolated to increase the number of transactions that can be processed within each sub-group. The above is an example of the flexibility of resource assignment provided by the bus-coupled slice architecture depicted in FIG. 2, and is not a limitation as to any particular configurations that might be supported for mapping sets of threads or individual threads to resources such as dispatch queues Disp0-Disp7, execution slices ES0-ES7, LS slices LS0-LS7 and cache slices CS0-CS7.

In another configuration, according to another state of the mode control signal(s), clusters CLA and CLB are configured to execute instructions for a common pool of threads, or for a single thread in an ST mode. In such a configuration, cache slices CS0-CS7 may be joined to form a larger cache that is accessible by instructions dispatched to any of execution slices ES0-ES7 via any of load-store slices LS0-LS7. Cache slices CS0-CS7 may be organized into a partitioned cache, for example by using the operand address of each cache operation to determine which of cache slices CS0-CS7 or sub-groups of cache slices CS0-CS7 should support an operation. For example, cache lines may be split across sub-groups of cache slices CS0-CS3 and CS4-CS7, such that a particular bit of the operand address selects which of the two groups of cache slices CS0-CS3 and CS4-CS7 will contain the specified value, forming an interleave of cache lines. For example, cache slices CS0-CS3 may store data values having odd cache line addresses and cache slices CS4-CS7 may store data values having even cache line addresses. In such a configuration, the number of unique cache lines addresses indexed within the cache may be held constant when selecting between modes in which the cache slices CS0-CS7 are partitioned among sets of threads and modes in which cache slices CS0-CS7 are joined. In another example, data may be "striped" across cache slices CS0-CS7 using three bits of the operand address to determine a target one of cache slices CS0-CS7, forming an interleave mapping with a factor of 8. The above-illustrated examples are not exhaustive, and there are many different ways to assign data values to particular ones of cache slices CS0-CS7. For example, certain block or vector operations may deterministically span cache slices CS0-CS7 or sub-groups thereof, permitting early-decode-based assignment to one of execution slices ES0-ES7 or as among clusters CLA or CLB. Dispatch queues Disp0-Disp7 and/or execution slices ES0-ES7 may determine the appropriate target one (or more) of cache slices CS0-CS7 for an operation based on the operation type, address generation, a prediction structure, or other mechanisms. In one such exemplary embodiment of an operating mode, operations having odd operand addresses will be identified for processing on load-store slices LS0-LS3 only and cache slices CS0-CS3 are joined to only contain values representing odd addresses. Similarly, in such an exemplary embodiment of an operating mode, operations having even operand addresses are identified for processing by load-store slices LS4-LS7 only and cache slices CS4-CS7 only contain values representing even addresses. In the above-described configuration, cache slices CS0-CS7 may be conceptually joined, however, certain implementations such as vector or cache block operations do not require a full cross-bar routing between all load-store slices LS4-LS7, execution slices ES0-ES7 and cache slices CS0-CS7. In other configurations according to other modes, and/or in other embodiments of the invention, cache slices CS0-CS7 may be further partitioned to support SMT operations with four, eight, etc., independent partitions available to pools of hardware threads, as the illustrated embodiment having eight execution slices, eight load-store slices and eight cache slices is only illustrative and larger numbers of slices or clusters may be present in other embodiments of the invention.

Figure 3:
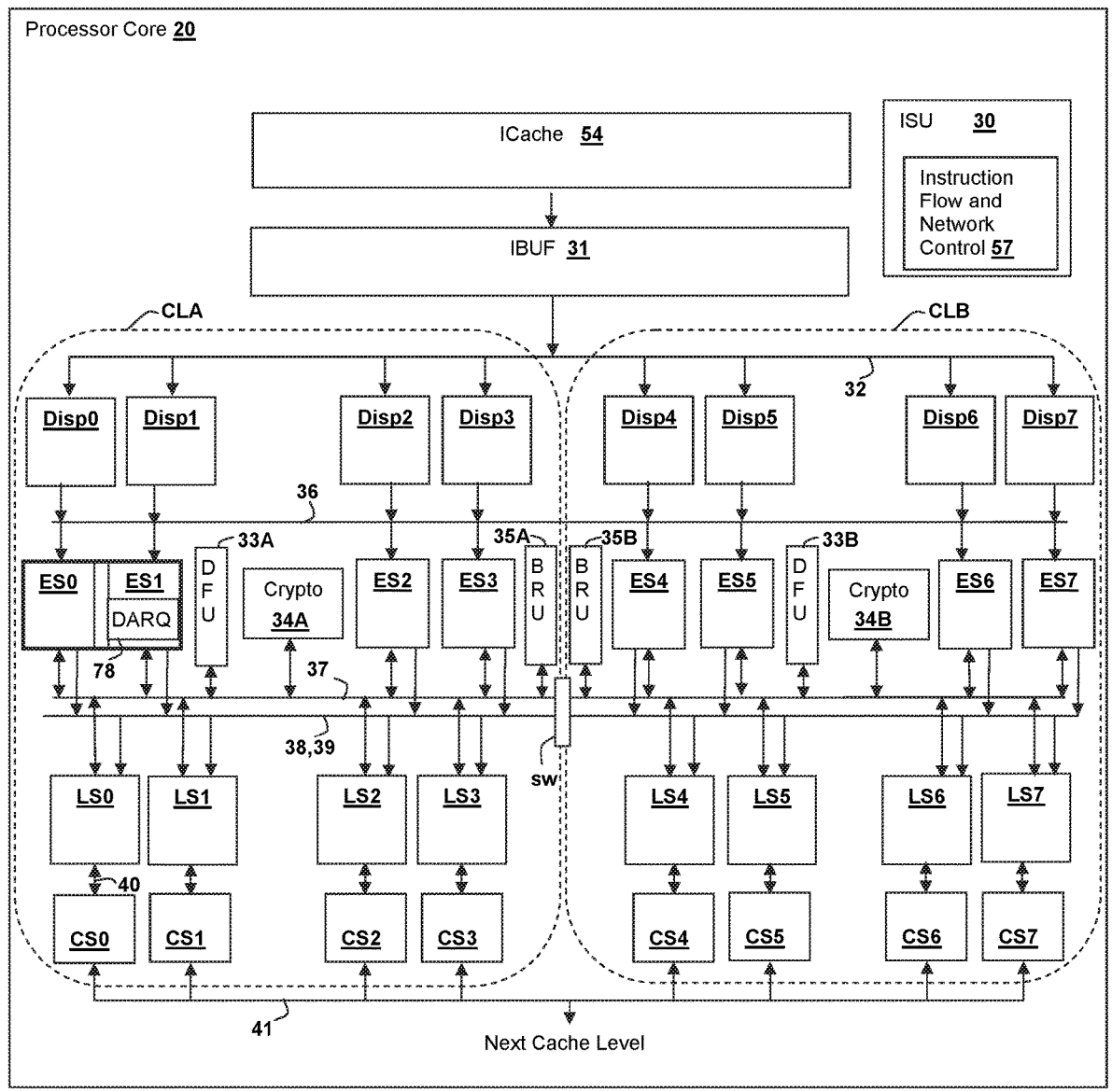
FIG. 3 is a pictorial diagram illustrating configuration of processor core 20 in particular operating modes.

Referring now to FIG. 3, an example of another configuration feature implemented within processor 20 is illustrated. In FIG. 3 execution slices ES0 and ES1 have been linked as a "super-slice" for executing an instruction that has operand width and/or operator width twice the width of instructions that are handled by execution slices ES0 and ES1 individually. For example, execution slices ES0 and ES1 may have 64-bit width and may be combined in a 128-bit super-slice according to the state of a mode control signal. Such a configuration may be used for executing instructions having, for example, operands in vector pairs that are processed by the same instruction. Alternatively, or in combination, the operator may be a wider operator or may contain immediate fields requiring the extra width. The super-slice configuration is not limited to pairs of execution slices. For example, three or more of execution slices ES0-ES7 might be linkable to provide a still wider operand and/or operator handling. For the wider 128-bit wide operations, dispatch queues such as Disp0 and Disp1 may also be joined. Alternatively, wider operations may be dispatch routed from a single one of dispatch queues Disp0-Disp7 to more than one of execution slice ES0-ES7 over dispatch routing network 36. In such an embodiment, if a super-slice is not available to execute a wider operation, the wider operation may be blocked from dispatch and may be retained in the dispatch queue until a super-slice is available. Operations for other hardware threads that share the same dispatch queue can continue to be dispatched. Some wide operations, such as vector operations that do not require concurrent execution of each element of the vector, may be executed by a single execution slice, or a disjoint set of execution slices without requiring availability of a super-slice.

Figure 4:
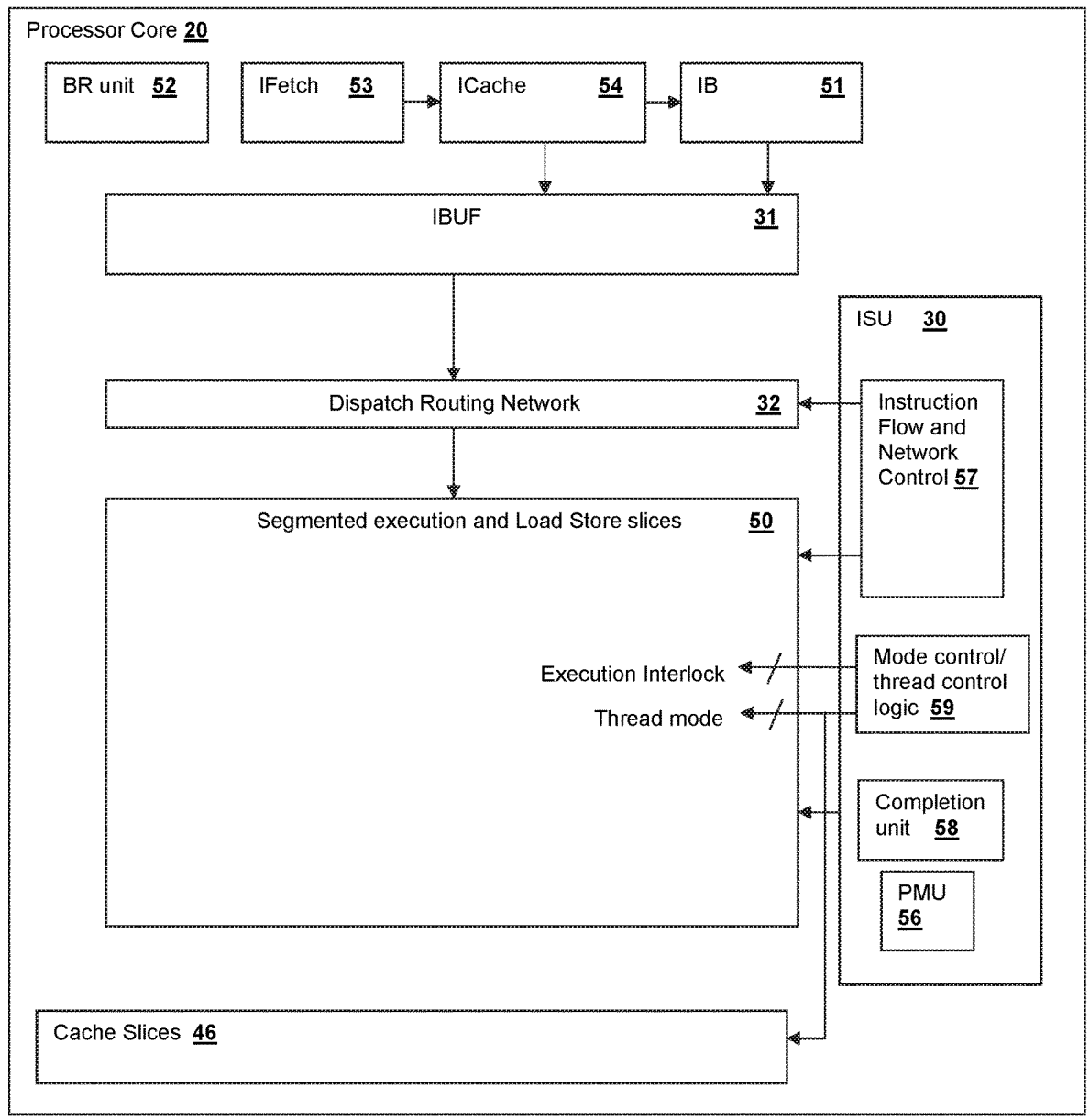
FIG. 4 is a block diagram illustrating details of processor core 20.

Referring now to FIG. 4, further details of processor core 20 are illustrated. Processor core 20 includes a branch execution unit 52 that evaluates branch instructions, and an instruction fetch unit (IFetch) 53 that controls the fetching of instructions including the fetching of instructions from ICache 54. Instruction sequencer unit (ISU) 30 controls the sequencing of instructions. An input instruction buffer (IB) 51 buffers instructions in order to map the instructions according to the execution slice resources allocated for the various threads and any super-slice configurations that are set. Another instruction buffer (IBUF) 31 is partitioned to maintain dispatch queues (Disp0-Disp7 of FIGS. 2-3) and dispatch routing network 32 couples IBUF 31 to the segmented execution and load-store slices 50, which are coupled to cache slices 46. Instruction flow and network control block 57 performs control of segmented execution and load-store slices 50, cache slices 46 and dispatch routing network 32 to configure the slices as illustrated in FIGS. 2-3, according to a mode control/thread control logic 59. An instruction completion unit 58 is also provided to track completion of instructions sequenced by ISU 30. ISU 30 also contains logic to control write-back operations by load-store slices LS0-LS7 within segmented execution and load-store slices 50. A power management unit 56 may also provide for energy conservation by reducing or increasing a number of active slices within segmented execution and cache slices 50. Although ISU 30 and instruction flow and network control block 57 are shown as a single unit, control of segmented execution within and between execution slices ES0-ES7 and load store slices LS0-LS7 may be partitioned among the slices such that each of execution slices ES0-ES7 and load store slices LS0-LS7 may control its own execution flow and sequencing while communicating with other slices.

Figure 5:
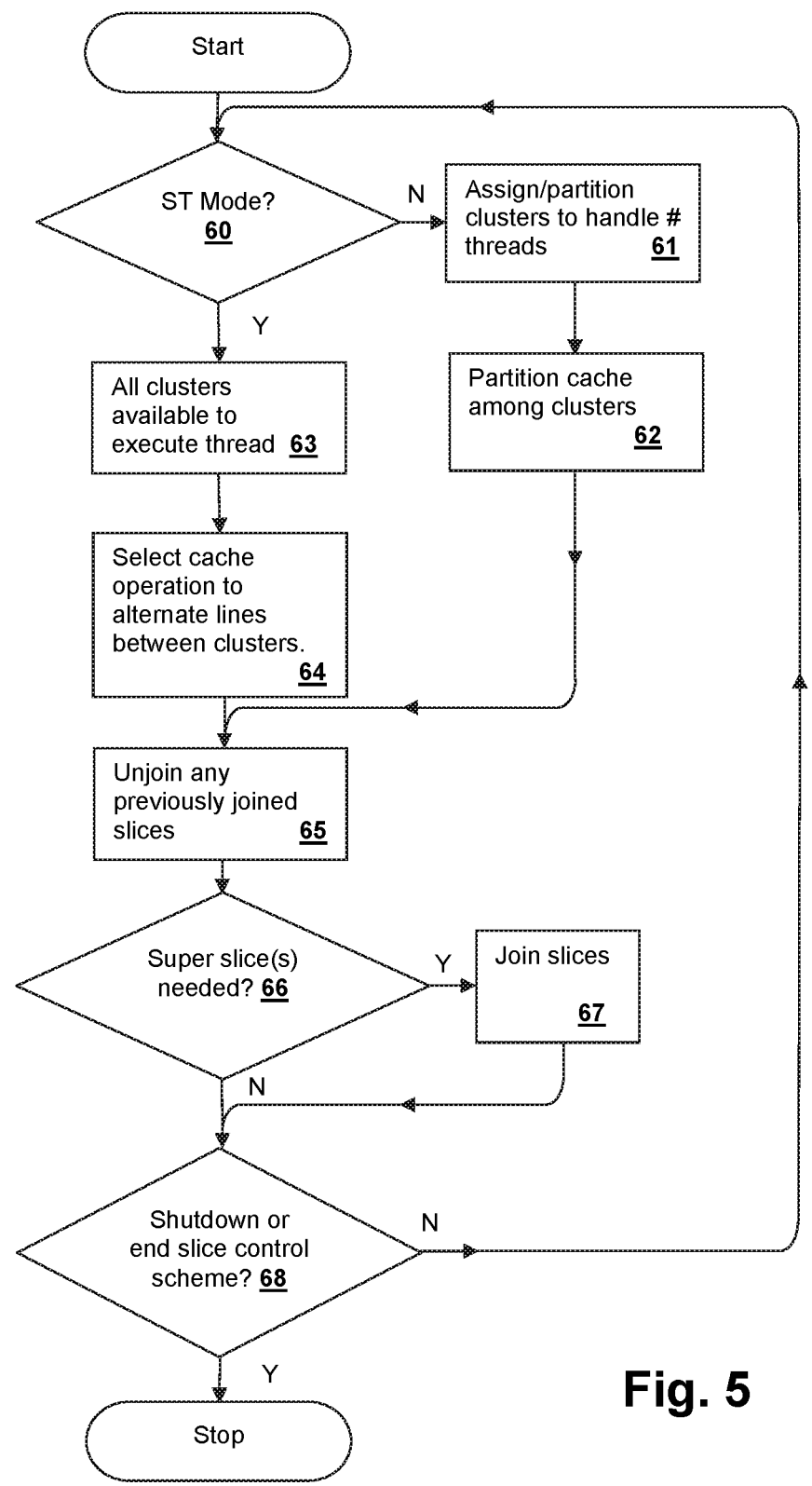
FIG. 5 is a flowchart illustrating a method of operating processor core 20.

Referring now to FIG. 5, a method of operating processor core 20 is shown according to an embodiment of the present invention. If processor core 20 is in ST mode (decision 60) all clusters are available to execute instruction streams for the thread (step 63) and cache operation is selected to alternate partitions formed by cache slices CS0-CS3 and cache slices CS4-CS7 for odd and even cache lines of instruction streams for the thread for execution by clusters CLA and CLB, respectively (step 64). If processor core 20 is not in ST mode (decision 60), then clusters CLA and CLB are assigned to execute the multiple threads and may be further partitioned among threads, such as assigning sets of execution slices, load-store slices, cache slices and dispatch queues to sets of threads (step 61). Cache slices CS0-CS3 and cache slices CS4-CS7 are mapped to the different threads so that the cache slices CS0-CS3 and cache slices CS4-CS7 are mapped for use by clusters CLA and CLB, respectively (step 62). During configuration, any previously joined execution slices are un-joined (step 65) and if super-slice(s) are needed (decision 66) execution slices are joined to form the super-slice(s) (step 67). Until the system is shut down or the slice control scheme is ended (decision 68), the process of steps 60-67 is repeated as needed for changing the configuration of processor core 20.

Figure 6:
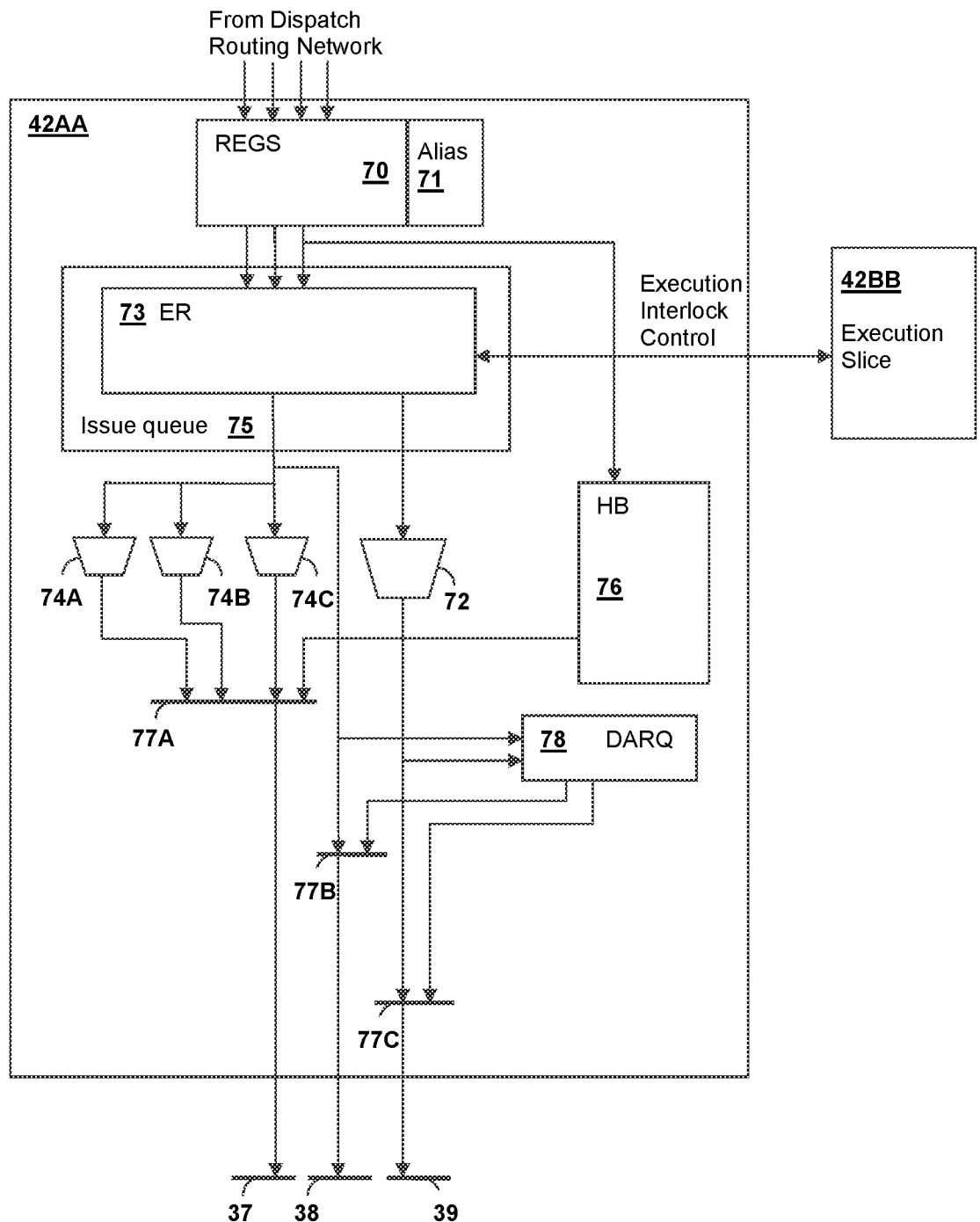
FIG. 6 is a block diagram illustrating details of an instruction execution slice 42AA that can be used to implement instruction execution slices ES0-ES7 of FIGS. 2-3.

Referring now to FIG. 6, an example of an execution slice (ES) 42AA that can be used to implement instruction execution slices ES0-ES7 in FIGS. 2-3 is shown. Inputs from the dispatch queues are received via dispatch routing network 32 by a register array 70 so that operands and the instructions can be queued in execution reservation stations (ER) 73 of issue queue 75. Register array 70 is architected to have independent register sets for independent instruction streams or where execution slice 42AA is joined in a super-slice executing multiple portions of an SIMD instruction, while dependent register sets that are clones in super-slices are architected for instances where the super-slice is executing non-SIMD instructions. An alias mapper 71 maps the values in register array 70 to any external references, such as write-back values exchanged with other slices over write-back routing network 37. A history buffer HB 76 provides restore capability for register targets of instructions executed by ES 42AA. Registers may be copied or moved between super-slices using write-back routing network 37 in response to a mode control signal, so that the assignment of slices to a set of threads or the assignment of slices to operate in a joined manner to execute as a super-slice together with other execution slices can be reconfigured. Execution slice 42AA is illustrated alongside another execution slice 42BB to illustrate an execution interlock control that may be provided between pairs of execution slices within execution slices ES0-ES7 of FIGS. 2-3 to form a super-slice. The execution interlock control provides for coordination between execution slices 42AA and 42BB supporting execution of a single instruction stream, since otherwise execution slices ES0-ES7 independently manage execution of their corresponding instruction streams.

Execution slice 42AA includes multiple internal execution pipelines 74A-74C and 72 that support out-of-order and simultaneous execution of instructions for the instruction stream corresponding to execution slice 42AA. The instructions executed by execution pipelines 74A-74C and 72 may be internal instructions implementing portions of instructions received over dispatch routing network 32, or may be instructions received directly over dispatch routing network 32, i.e., the pipelining of the instructions may be supported by the instruction stream itself, or the decoding of instructions may be performed upstream of execution slice 42AA. Execution pipeline 72 is illustrated separately multiplexed to show that single-pipeline, multiple-pipeline or both types of execution units may be provided within execution slice 42AA. The pipelines may differ in design and function, or some or all pipelines may be identical, depending on the types of instructions that will be executed by execution slice 42AA. For example, specific pipelines may be provided for address computation, scalar or vector operations, floating-point operations, etc. Multiplexers 77A-77C provide for routing of execution results to/from history buffer 76 and routing of write-back results to write-back routing network 37, I/O routing network 39 and AGEN routing network(s) 38 that may be provided for routing specific data for sharing between slices or operations, or for load and store address and/or data sent to one or more of load-store slices LS0-LS7. Data, address and recirculation queue (DARQ) 78 holds execution results or partial results such as load/store addresses or store data that are not guaranteed to be accepted immediately by the next consuming load-store slice LS0-LS7 or execution slice ES0-ES7. The results or partial results stored in DARQ 78 may need to be sent in a future cycle, such as to one of load-store slices LS0-LS7, or to special execution units such as one of cryptographic processors 34A, 34B. Data stored in DARQ 78 may then be multiplexed onto AGEN bus 38 or store data bus 39 by multiplexers 77B or 77C, respectively.

Figure 7:
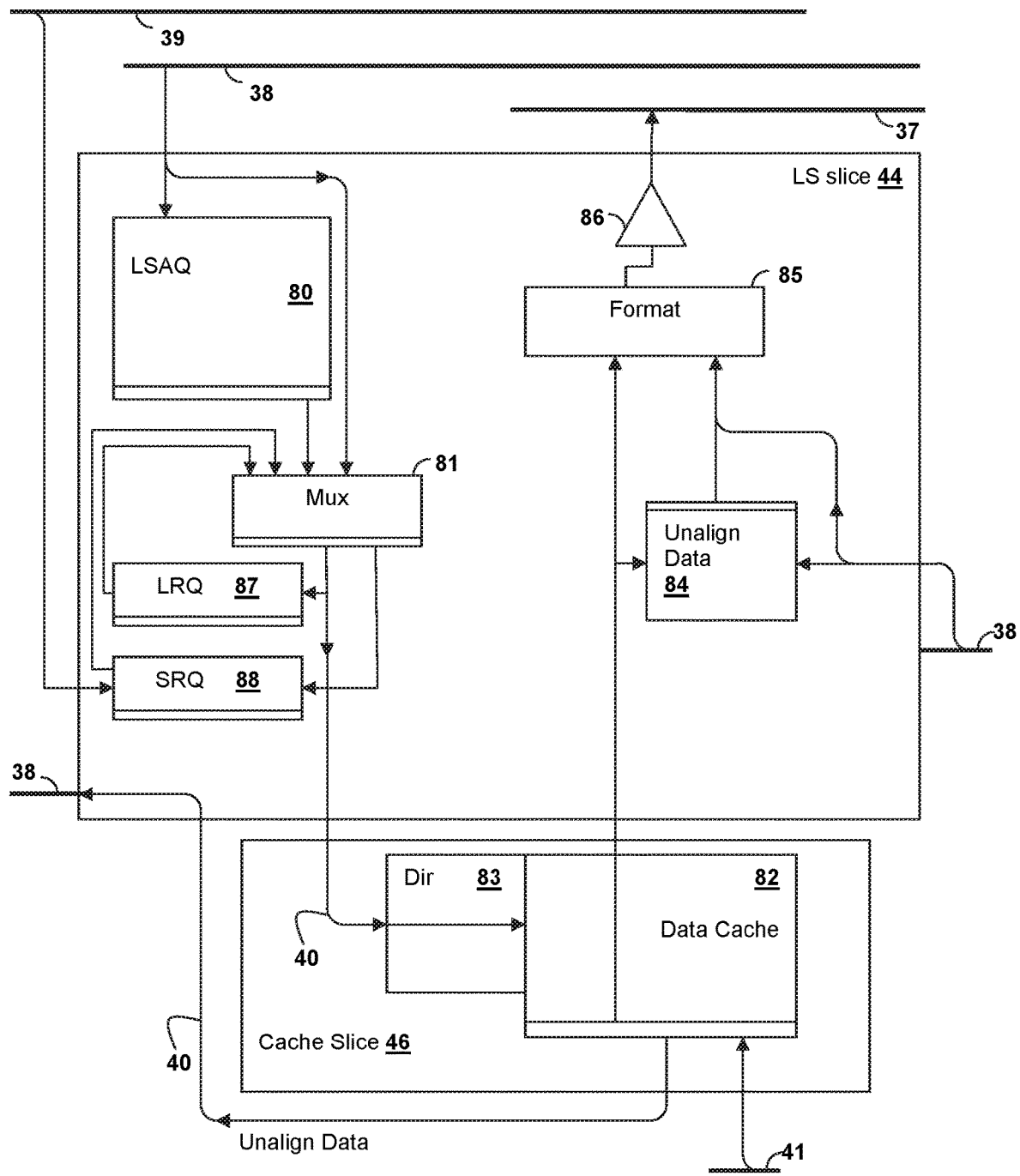
FIG. 7 is a block diagram illustrating details of a load store slice 44 and a cache slice 46 that can be used to implement load-store slices LS0-LS7 and cache slices CS0-CS7 of FIGS. 2-3.

Referring now to FIG. 7, an example of a load-store (LS) slice 44 that can be used to implement load-store slices LS0-LS7 in FIGS. 2-3 is shown. A load/store access queue (LSAQ) 80 is coupled to AGEN bus 38, and the direct connection to AGEN bus 38 and LSAQ 80 is selected by a multiplexer 81 that provides an input to a cache directory 83 of a data cache 82 in cache slice 46 via memory bus 40. The output of multiplexer 81 also provides an input to a load reorder queue (LRQ) 87 or store reorder queue (SRQ) 88 from either LSAQ 80 or from AGEN bus 38, or to other execution facilities within load-store slice 44 that are not shown. Load-store slice 44 may include one or more instances of a load-store unit that execute load-store operations and other related cache operations. To track execution of cache operations issued to LS slice 44, LRQ 87 and SRQ 88 contain entries for tracking the cache operations for sequential consistency and/or other attributes as required by the processor architecture. While LS slice 44 may be able to receive multiple operations per cycle from one or more of execution slices ES0-ES7 over AGEN bus 38, all of the accesses may not be concurrently executable in a given execution cycle due to limitations of LS slice 44. Under such conditions, LSAQ 80 stores entries corresponding to as yet un-executed operations. SRQ 88 receives data for store operations from store data bus 39, which are paired with operation information such as the computed store address. As operations execute, hazards may be encountered in the load-store pipe formed by LS slice 44 and cache slice 46, such as cache miss, address translation faults, cache read/write conflicts, missing data, or other faults which require the execution of such operations to be delayed or retried. In some embodiments, LRQ 87 and SRQ 88 are configured to re-issue the operations into the load-store pipeline for execution, providing operation independent of the control and operation of execution slices ES0-ES7. Such an arrangement frees resources in execution slices ES0-ES7 as soon as one or more of load-store slices LS0-LS7 has received the operations and/or data on which the resource de-allocation is conditioned. LSAQ 80 may free resources as soon as operations are executed or once entries for the operations and/or data have been stored in LRQ 87 or SRQ 88. Control logic within LS slice 44 communicates with DARQ 78 in the particular execution slice ES0-ES7 issuing the load/store operation(s) to coordinate the acceptance of operands, addresses and data. Connections to other load-store slices are provided by AGEN bus 38 and by write-back routing network 37, which is coupled to receive data from data cache 82 of cache slice 46 and to provide data to a data un-alignment block 84 of a another slice. A data formatting unit 85 couples cache slice 44 to write-back routing network 37 via a buffer 86, so that write-back results can be written through from one execution slice to the resources of another execution slice. Data cache 82 of cache slice 46 is also coupled to I/O routing network 41 for loading values from higher-order cache/system memory and for flushing or casting-out values from data cache 82. In the examples given in this disclosure, it is understood that the instructions dispatched to instruction execution slices ES0-ES7 may be full external instructions or portions of external instructions, i.e., decoded "internal instructions." Further, in a given cycle, the number of internal instructions dispatched to any of instruction execution slices ES0-ES7 may be greater than one and not every one of instruction execution slices ES0-ES7 will necessarily receive an internal instruction in a given cycle.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A processor core, comprising:
a plurality of dispatch queues for receiving instructions of a corresponding plurality of instruction streams;
a plurality of parallel instruction execution slices for executing the corresponding plurality of instruction streams in parallel;
a plurality of cache slices containing mutually-exclusive segments of a lowest-order level of cache memory; and
a plurality of load-store slices coupling the plurality of cache slices to the plurality of parallel instruction execution slices, the plurality of load-store slices for executing load and store portions of execution corresponding to the instructions of the corresponding plurality of instruction streams and controlling access by the plurality of parallel instruction execution slices to the plurality of cache slices, wherein individual ones of the plurality of load-store slices are coupled to corresponding ones of the plurality of cache slices, wherein storage of the lowest-order level of cache memory is partitioned among the plurality of load-store slices, wherein the individual ones of the plurality of load-store slices manage access to a corresponding one of the plurality of cache slices, wherein the individual ones of the plurality of load-store slices include a load-store access queue that receives load and store operations corresponding to the load and store portions of the instructions of the corresponding plurality of instruction streams, a load reorder queue containing first entries for tracking load operations issued to a corresponding cache slice and a store reorder queue containing second entries for tracking store operations issued to the corresponding cache slice.

2. The processor core of claim 1, wherein the plurality of load-store slices and the plurality of cache slices are responsive to a mode control signal such that in a first configuration corresponding to a first state of the mode control signal, at least two of the plurality of cache slices are separately partitioned between at least two of the plurality of parallel instruction execution slices to appear as multiple cache memories with contiguous cache lines, and wherein in a second configuration corresponding to a second state of the mode control signal, the plurality of cache slices are combined to appear as a cache memory that is shared by the at least two of the plurality of parallel instruction execution slices.

3. The processor core of claim 2, wherein in the first configuration corresponding to the first state of the mode control signal, the at least two of the plurality of parallel instruction execution slices separately execute first instructions of a first operand width and a first operator width of at least two of the corresponding plurality of instruction streams, and wherein in the second configuration corresponding to the second state of the mode control signal, the at least two of the plurality of parallel instruction execution slices are linked for executing second instructions of a second operand width that is a multiple of the first operand width or a second operator width that is a multiple of the first operator width, the second instructions being instructions of a single one of the plurality of instruction streams.

4. The processor core of claim 1, wherein the plurality of parallel instruction execution slices are organized into two or more clusters, and wherein the plurality of cache slices are interleave mapped to corresponding different ones of the two or more clusters.

5. The processor core of claim 1, wherein the load reorder queue and the store reorder queue are configured to re-issue load and store operations into a load-store pipeline of the individual ones of the plurality of load-store slices that includes the load reorder queue and the store reorder queue.

6. The processor core of claim 1, wherein the individual ones of the plurality of load-store slices include a data unalignment circuit that receives data from another load-store slice.

7. The processor core of claim 1, wherein the individual ones of the plurality of load-store slices further include a data formatting circuit that couples the individual ones of the plurality of load-store slices to their corresponding cache slices, so that write-back results from operations received from one of the plurality of parallel instruction execution slices are provided to another one of the plurality of parallel instruction execution slices.

8. A computer system, comprising:
at least one processor core for executing program instructions of a corresponding plurality of instruction streams; and
a memory coupled to the at least one processor core for storing the program instructions, wherein the at least one processor core comprises a plurality of dispatch queues for receiving instructions of a corresponding plurality of instruction streams, a plurality of parallel instruction execution slices for executing the corresponding plurality of instruction streams in parallel, a plurality of cache slices containing mutually-exclusive segments of a lowest-order level of cache memory, and a plurality of load-store slices coupling the plurality of cache slices to the plurality of parallel instruction execution slices, the plurality of load-store slices for executing load and store portions of execution corresponding to the instructions of the corresponding plurality of instruction streams and controlling access by the plurality of parallel instruction execution slices to the plurality of cache slices, wherein individual ones of the plurality of load-store slices are coupled to corresponding ones of the plurality of cache slices, wherein storage of the lowest-order level of cache memory is partitioned among the plurality of load-store slices, wherein the individual ones of the plurality of load-store slices manage access to a corresponding one of the plurality of cache slices, wherein the individual ones of the plurality of load-store slices include a load-store access queue that receives load and store operations corresponding to the load and store portions of the instructions of the corresponding plurality of instruction streams, a load reorder queue containing first entries for tracking load operations issued to a corresponding cache slice and a store reorder queue containing second entries for tracking store operations issued to the corresponding cache slice.

9. The computer system of claim 8, wherein the plurality of load-store slices and the plurality of cache slices are responsive to a mode control signal such that in a first configuration corresponding to a first state of the mode control signal, at least two of the plurality of cache slices are separately partitioned between at least two of the plurality of parallel instruction execution slices to appear as multiple cache memories with contiguous cache lines, and wherein in a second configuration corresponding to a second state of the mode control signal, the plurality of cache slices are combined to appear as a cache memory that is shared by the at least two of the plurality of parallel instruction execution slices.

10. The computer system of claim 9, wherein in the first configuration corresponding to the first state of the mode control signal, the at least two of the plurality of parallel instruction execution slices separately execute first instructions of a first operand width and a first operator width of at least two of the corresponding plurality of instruction streams, and wherein in the second configuration corresponding to the second state of the mode control signal, the at least two of the plurality of parallel instruction execution slices are linked for executing second instructions of a second operand width that is a multiple of the first operand width or a second operator width that is a multiple of the first operator width, the second instructions being instructions of a single one of the plurality of instruction streams.

11. The computer system of claim 8, wherein the plurality of parallel instruction execution slices are organized into two or more clusters, and wherein the plurality of cache slices are interleave mapped to corresponding different ones of the two or more clusters.

12. The computer system of claim 8, wherein the load reorder queue and the store reorder queue are configured to re-issue load and store operations into a load-store pipeline of the individual ones of the plurality of load-store slices that includes the load reorder queue and the store reorder queue.

13. The computer system of claim 8, wherein the individual ones of the plurality of load-store slices include a data unalignment circuit that receives data from another load-store slice.

14. A method of executing program instructions by a processor core, the method comprising:
storing instructions of a plurality of instruction streams in a plurality of dispatch queues of the processor core;
executing the plurality of instruction streams in parallel with a plurality of parallel instruction execution slices by receiving instructions from the plurality of dispatch queues;
controlling access by the plurality of parallel instruction execution slices to a plurality of cache slices of the processor core via a plurality of load-store units, the plurality of cache slices containing mutually-exclusive segments of a lowest-order level of cache memory, wherein individual ones of the plurality of load-store units are coupled to corresponding ones of the plurality of cache slices, wherein storage of the lowest-order level of cache memory is partitioned among the plurality of load-store units, and wherein the individual ones of the plurality of load-store units manage access to a corresponding one of the plurality of cache slices;

receiving load and store operations corresponding to load and store portions of instructions executed by the plurality of parallel instruction execution slices by a load/store access queue within the individual ones of the plurality of load-store units;

tracking load operations issued to a corresponding cache slice with a load reorder queue containing first entries within the individual ones of the plurality of load-store units; and tracking store operations issued to the corresponding cache slice with a store reorder queue containing second entries within the individual ones of the plurality of load-store units.

15. The method of claim 14, wherein the controlling access is responsive to a mode control signal such that in a first configuration corresponding to a first state of the mode control signal, at least two of the plurality of cache slices are separately partitioned between at least two of the plurality of parallel instruction execution slices to appear as multiple cache memories with contiguous cache lines, and wherein in a second configuration corresponding to a second state of the mode control signal, the plurality of cache slices are combined to appear as a cache memory that is shared by the at least two of the plurality of parallel instruction execution slices.

16. The method of claim 15, further comprising:

in the first configuration corresponding to the first state of the mode control signal, the at least two of the plurality of parallel instruction execution slices separately executing first instructions of a first operand width and a first operator width of at least two of a corresponding plurality of instruction streams;

in the second configuration corresponding to the second state of the mode control signal, linking the at least two of the plurality of parallel instruction execution slices to execute second instructions of a second operand width that is a multiple of the first operand width or a second operator width that is a multiple of the first operator width, the second instructions being instructions of a single one of the plurality of instruction streams.

17. The method of claim 14, wherein the plurality of parallel instruction execution slices are organized into two or more clusters, and wherein the plurality of cache slices are interleave mapped to corresponding different ones of the two or more clusters.

18. The method of claim 14, further comprising re-issuing load and store operations into a load-store pipeline of the individual ones of the plurality of load-store units that includes the load reorder queue and the store reorder queue from the load reorder queue and the store reorder queue.

19. The method of claim 14, further comprising at one of the individual ones of the plurality of load-store units, receiving data from another load-store unit at a data unalignment unit of the one of the individual ones of the plurality of load-store units.

20. The method of claim 14, wherein the individual ones of the plurality of load-store units further include a data formatting unit that couples the individual ones of the plurality of load-store units to their corresponding cache slices, so that write-back results from operations received from one of the plurality of parallel instruction execution slices are provided to another one of the plurality of parallel instruction execution slices.

* * * * *